(12) United States Patent
Kurian et al.

(10) Patent No.: US 10,027,673 B2
(45) Date of Patent: Jul. 17, 2018

(54) SYSTEM FOR CONTROLLED DATA EXCHANGE IN A FILE HOSTING SERVICE ENVIRONMENT

(71) Applicant: BANK OF AMERICA CORPORATION, Charlotte, NC (US)

(72) Inventors: Manu Jacob Kurian, Dallas, TX (US); Sorin N. Cismas, Addison, TX (US); Paul Grayson Roscoe, Chester (GB); Mahesh Kumar Bhashetty, Plainsboro, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 223 days.

(21) Appl. No.: 14/986,819

(22) Filed: Jan. 4, 2016

(65) Prior Publication Data
US 2017/0195335 A1    Jul. 6, 2017

(51) Int. Cl.
*H04L 29/00* (2006.01)
*H04L 29/06* (2006.01)
*H04L 29/08* (2006.01)

(52) U.S. Cl.
CPC .......... *H04L 63/102* (2013.01); *H04L 63/083* (2013.01); *H04L 63/1408* (2013.01); *H04L 67/02* (2013.01); *H04L 67/06* (2013.01); *H04L 67/10* (2013.01)

(58) Field of Classification Search
CPC .......... H04L 67/10; H04L 67/06; H04L 67/12; H04L 12/2807
See application file for complete search history.

(56) References Cited

U.S. PATENT DOCUMENTS

| | | | |
|---|---|---|---|
| 2007/0028291 A1* | 2/2007 | Brennan | H04L 63/1408 726/1 |
| 2008/0155120 A1* | 6/2008 | Argawal | H04L 67/104 709/242 |
| 2014/0047526 A1* | 2/2014 | Huang | H04L 63/083 726/7 |
| 2014/0129605 A1* | 5/2014 | Huang | G06Q 50/01 709/201 |
| 2014/0289853 A1* | 9/2014 | Teddy | H04L 63/1416 726/23 |

* cited by examiner

*Primary Examiner* — Ghazal Shehni
(74) *Attorney, Agent, or Firm* — Michael A. Springs; Moore & Van Allen PLLC; James C. Edwards (57) ABSTRACT

The present invention provides for managing and controlling data file transfer exchange to and from file hosting services, such as cloud-based file hosting services. Specifically, the present invention control what data files are authorized for uploading to the file hosting service and downloading from the file hosting service, as well as, controlling the access to such files after uploading or downloading the data file.

19 Claims, 4 Drawing Sheets

SYSTEM FOR CONTROLLED DATA EXCHANGE IN A FILE HOSTING SERVICE ENVIRONMENT

FIELD

In general, embodiments of the invention relate to data file transmissions in computing networks and, more particularly, systems and the like for controlling data file transfer exchange to and from file hosting services, such as cloud-based file hosting services.

BACKGROUND

Publically-accessible file hosting services, otherwise referred to a cloud services have become a popular means for not only storing data, but also transferring data files between entities. For example, a user/subscriber of a file hosting service may post/upload data files to the service/cloud, and, once posted/uploaded, another entity, referred to herein as an authorized entity, may access the file hosting service to download the data files. Conversely, the authorized entity may post/upload data files to the service/cloud and, once posted/uploaded, the user/subscriber may access the file hosting service to download the data files.

While the file hosting service itself provides for some level of access control and managements in terms who is authorized to access the service/cloud, most if not all of the access control and protection are from the standpoint of the user/subscriber. In this regard, the authorized entity is provided little, if any, access control management and other security mechanisms. This problem is exasperated in instances in which the authorized entity is granted read, execute and write access rights on the file hosting service.

For example, once an authorized entity has been provided all-inclusive access rights to a service/cloud, the service/cloud provides the authorized entity no protection over the type of data files uploaded to the service/cloud or downloaded from the service/cloud nor the nature of the content provided in those data files. In this regard, the authorized entity may, intentional (e.g., wrongfully or the like) or unintentional (e.g., erroneously or the like) upload a data file not intended for the user/subscriber or a data file that contains data elements not intended for the user/subscriber.

Moreover, the public nature of such filing hosting services means that while the authorized entity may be under the impression that the data files are being shared privately (i.e., solely between the authorized entity and the user/subscriber), in fact, either unintentional or intentionally, the data files may be shared/accessed by other entities that have been granted access by the user/subscriber.

Therefore, a need exists to provide authorized entities, who have been granted access to a file hosting service, access/data management control over data files intended to be uploaded to the file hosting service and data files intended to be downloaded from the file hosting service. The desired systems and the like should be protect the authorized entity from intentional/wrongful and unintentional/negligent uploading or downloading improper data files and/or improper data elements within the data files. Moreover, the desired systems should eliminate the possibility of the data files being accessed by other entities/parties other than rightfully authorized to access the data files.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for provide for managing and controlling data file transfer exchange to and from file hosting services, such as cloud-based file hosting services. Specifically, the present invention allows for an authorized entity (i.e., an entity that has been granted access by a user/subscriber to a publically-accessible file hosting service) to control/manage what and how data files get uploaded from the entity to the file hosting service and what and how files get downloaded from the file hosting service to the entity.

In specific embodiments of the invention, a landing zone (i.e., a gateway storage component) is employed between the file hosting service(s) and the authorized entity that serves to temporarily store the data files prior to transfer to and from the file hosting service. The landing zone allows for the data file to be heuristically analyzed to determine whether the data file is authorized for uploading to the file hosting service and/or downloading to the authorized entity. In such embodiments of the invention, the heuristic analysis/determination may entail comparing the content of the file to predefined authorized content. In other specific embodiments of the invention the landing zone may employ rules, such as business rules or the like, which may be specific to designated portions/units of the entity, in determining whether a data file a data file is authorized for uploading and/or downloading or how to manage the uploading and/or downloading of the file.

A system for controlled data file exchange to and from a file hosting service, defines first embodiments of the invention. The system includes a publically-accessible file hosting service (e.g., a cloud service or the like) configured to store data files. Additionally, the system includes a data file landing zone that is in computing network communication with the file hosting service. The landing zone is configured logically manage access by an authorized entity to the file hosting service by controlling (1) uploading of data files to the file hosting service, and (2) downloading of data files from the hosting service. The authorized entity is an entity, such as an enterprise or the like, that has been granted access to the file hosting service by a user/subscriber of the file hosting service. In this regard, the landing zone acts as a gateway that temporarily houses/stores the data files while the access controls are implemented (i.e., prior to uploading data files to the file hosting service and/or downloading data files from the file hosting service.

In accordance with specific embodiments of the system, the data file landing zone is further configured to control uploading of data files to the file hosting service and downloading of data files from the file hosting service by heuristically determining that a data file is authorized for uploading to the file hosting service or authorized for downloading from the file hosting service. In such embodiments of the system, determining whether a data file is authorized may include determining the content of the data file and comparing the content to predetermined authorized content rules.

In specific embodiments of the system, the data file landing zone is further configured to control uploading and downloading of data files to the file hosting service by denying data files found to include a virus or malware from being uploaded to the file hosting service or downloaded from the file hosting service and/or denying data files found to include confidential or non-public information from being uploaded to the file hosting service.

In still further specific embodiments of the system, the data file landing zone is further configured to control uploading of data files to the file hosting service by encrypting data files being uploaded to the file hosting service, such as split key encryption, double encryption or any other known or future known encryption methodology.

In still further specific embodiments of the system, the data file landing zone is further configured to control uploading of data files to the file hosting service by assigning a password to data files being uploaded to the file hosting service, wherein the password is required to be presented to access an associated data file. In such embodiments of the system, the password may be a use-limiting and/or time-limiting password such that the password is configured to allow for a predetermined number of accesses to the data file once it is uploaded to the file hosting service and/or the password may expire after a predetermined period of time. In other related embodiments of the invention, the password is configured such that presentation of the password triggers deletion or call-back of the data file.

Moreover, in other embodiments of the system, the data file landing zone is further configured to control uploading and/or download of data files by segmenting the data files in two or more portions, wherein each portion is uploaded or downloaded at a predetermined time interval.

In still further embodiments of the system, the data file landing zone is further configured to control uploading and downloading of data files to the file hosting service by determining the file format of the data and comparing the file format to file formats authorized for uploading or downloading, such that unauthorized file formats are denied uploading or downloading privileges.

In additional specific embodiments of the system, the data file landing zone is further configured to control uploading and downloading of data files to the file hosting service by implementing rules (e.g., business rules) configurable by the authorized entity. In such embodiments of the system, the rule may (1) define an allowable time period for accessing the data file within the data hosting service, (2) define criteria for removing the data file from the file hosting service, and/or (3) allow the authorizing entity to edit a data file that is stored within the file hosting service.

In still further embodiments of the system, the data file landing zone is further configured to control downloading of data files to the file hosting service by implementing a Uniform Resource Locator (URL) manager application configured to generate a new configuration in response to receiving a new URL from the file hosting service subscriber and update an existing configuration in response to receiving a revised URL from the file hosting service subscriber. Each URL is associated with a storage location of a data file within the file hosting service.

An apparatus for controlled data file exchange to and from a file hosting service, defines second embodiments of the invention. The apparatus includes a computing platform including a memory and at least one processor in communication with the memory. The apparatus additionally includes a gateway storage component that is included in the memory and configured to receive and temporarily store (2) first data files from an authorized entity that are intended to be uploaded to a publically-accessible file hosting service, and (2) second data filed from the file hosting service that are intended to be downloaded to the authorized entity. The apparatus further includes a data file exchange management module that is stored in the memory and executable by the processor. The module is configured to logically manage access by the authorized entity to the file hosting service by controlling (1) uploading of the first data files from the data storage unit to the file hosting service, and (2) downloading of second data files from the gateway storage component to the authorized entity. The authorized entity is granted access to the file hosting service by a user of the file hosting service.

In specific embodiments of the apparatus, the data file exchange management module is further configured to control uploading of the first data files to the file hosting service and downloading of the second data files by heuristically determining that the first data files are authorized for uploading to the file hosting service and that the second data files are authorized for downloading from the gateway storage component. In such embodiments of the apparatus, heuristically determining that the first data files are authorized for uploading to the file hosting service and that the second data files are authorized for downloading from the gateway storage component may be based on determining the content of a data file and comparing the content to predetermined authorized content rules.

A computer program product including a non-transitory computer-readable medium defines third embodiments of the invention. The computer-readable medium includes a first set of codes for causing a computer to receive and temporarily store, at a gateway storage component, first data files communicated from a file hosting service and intended for downloading by an authorized entity. In addition, the computer-readable medium includes a second set of codes for causing a computer to receive and temporarily store, at the gateway storage component, second data files communicated from the authorized entity and intended for uploading to the file hosting service. Moreover, the computer-readable medium includes a third set of codes for causing a computer to logically manage access by the authorized entity to the file hosting service by controlling (1) uploading of the first data files from the data storage unit to the file hosting service, and (2) downloading of second data files from the gateway storage component to the authorized entity.

Thus, systems, apparatus, methods, and computer program products herein described in detail below provide for controlling data file transfer exchange to and from file hosting services, such as cloud-based file hosting services. In this regard the present invention proves for an "outside in" approach to controlling data file exchanges between a file hosting service and an authorized entity (i.e., an entity that has been granted access by a user/subscriber to a publically-accessible file hosting service).

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for managing and controlling data file transfer exchange to and from file hosting services, such as cloud-based file hosting services. Specifically, the present invention allows for an authorized entity (i.e., an entity that has been granted access by a user/subscriber to a publically-accessible file hosting service) to control/manage what and how data files get uploaded from the entity to the file hosting service and control/manage what and how files get downloaded from the file hosting service to the entity.

Figure 1:
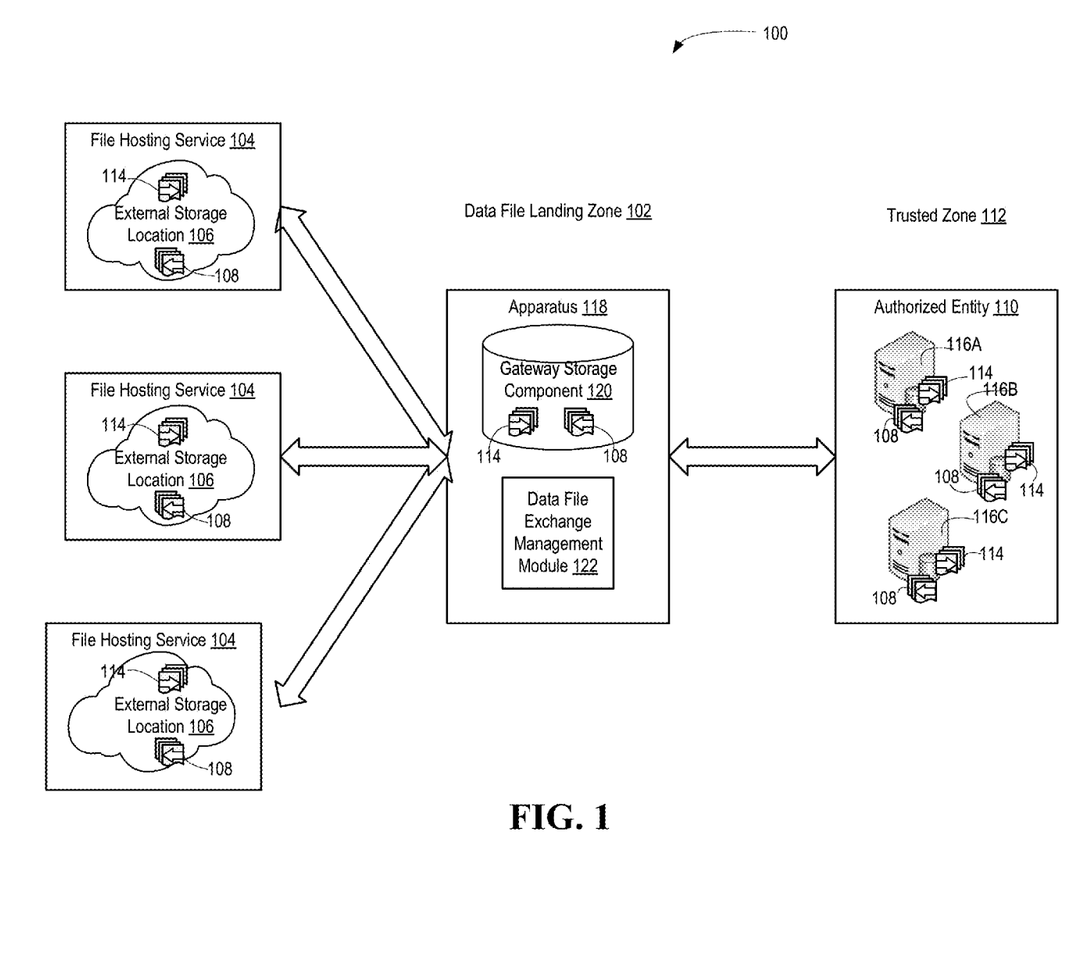
FIG. 1 provides a schematic diagram of an exemplary system for managing and controlling data file exchange amongst an authorized entity and file hosting service; in accordance with embodiments of the present invention.

Referring to FIG. 1, a schematic diagram is provided of a system 100 for managing and controlling data file exchange amongst an authorized entity and file hosting service, in accordance with embodiments of the present invention. The system 100 includes a data file landing zone 102 and one or more publically-accessible file hosting services 104 that provide external storage locations 106, such as cloud storage or the like. The data file landing zone 102 is configured to receive data files 108 from an authorized entity 110 located in trusted zone 112. The data files 108 are intended for uploading to one of the file hosting services 104. Additionally, the data file landing zone is configured to receive data files 114 from file hosting services 104 that are intended for download to the authorized entity 110.

The authorized entity 110, which has been granted access to each of the one or more file hosting services 104 by a corresponding user/subscriber of the file hosting service 104, may include more than one portion/unit, illustrated in FIG. 1 by server databases 116A, 116B and 116C. Each unit (i.e., business unit, division or the like) within the authorized entity 110 may have their own requirements in terms of data files exchange control and management (i.e., which data files may be uploaded to a file hosting service 104 and/or downloaded to a file hosting service 104 and the control over the data files authorized to be uploaded or downloaded).

The data file landing zone 102 includes an apparatus 118 comprising a gateway storage component 120 that is configured to temporarily store (i) data files 108 received from the authorized entity 110 and intended for upload to one of the file hosting services 104 and (ii) data files 114 received from one of the file hosting services 104 and intended for download to the authorized entity 110. The apparatus 118 additionally includes data file exchange management module 122 that is configured to heuristically analyze the data files 108 and 114 stored in the gateway storage component 120 to determine if the data files 108 and 114 are authorized for (i) uploading to the file hosting service 104 and/or (ii) downloading to the authorized entity 110. In addition, as described infra., data file exchange management module 122 may be configured to implement other functionality that provides access control over the data files 108 and 114 once the data files 108 and 114 have been uploaded to the file hosting service 104 or downloaded to the authorized entity 110. In accordance with specific embodiments of the invention, the data file exchange management module 122 may implement rules, such as business rules or the like, which may be specific to one or more of the portions/units of the authorized entity 110. In this regard, the data file exchange management module 122 is configured to provide control and management of the exchange of data files on a per-portion/unit basis, such as, e.g., on a per-business unit basis or the like.

In specific embodiments of the invention, the data file exchange management module 122, as will be discussed in more detail infra, is configured to compare the contents of the data file 108 and 114 to predetermined content rules to determine if the data files are authorized to be uploaded and/or downloaded. The predetermined rules, which may be unit-specific, may include non-public information rules, confidential information rules, file format rules and the like. In addition, as a means of authorizing uploading and downloading of data files 108 and 114, data file exchange management module 122 may implement one or more anti-virus and/or malware applications to insure that data files being uploaded and/or downloaded do not contain viruses and/or malware.

The data file exchange management module 122 may additionally implement one or more encryption applications, such as a double encryption application, split key encryption or the like to encrypt data files 108 and 114 prior to uploading and/or downloaded. Encryption serves as a further means of securing data files 108 that is uploaded to the file sharing service 104 and, in some instances, data files 114 downloaded from the file sharing service 104. Moreover, data file exchange management module 122 may implement other security features, such as password protection, including limited-use passwords and/or passwords that trigger deletion/call-back of the data file(s) 108 and 114. Additionally, the data file exchange management module 122 may implement data file segmentation and phased upload and/or download, in which the data file 108 and/or 114 is segmented into two or more portions prior to uploading and/or downloading and, each segment/portion is uploaded/downloaded at prescribed time intervals.

Additionally, data file exchange management module 122 is configured to control access to the data files 108 that have been uploaded to the file hosting service 104 and, in some embodiments, the data files 1114 downloaded from the file hosting service 104. In this regard, the module 122 may implement rules, which may be specific to a unit/portion of the authorized entity 110, to determine an access time, deletion/call-back and editing rights.

Further, the data landing zone 102 and, specifically, the data file exchange management module 122 is configured to provide streamlined and efficient management and control over regularly scheduled data file transfers (e.g., data file transfers that have been preconfigured to occur weekly, daily, hourly or the like), as well as, dynamic management and control over ad hoc (i.e., impromptu or "on-the-fly") data file transfers.

Figure 2:
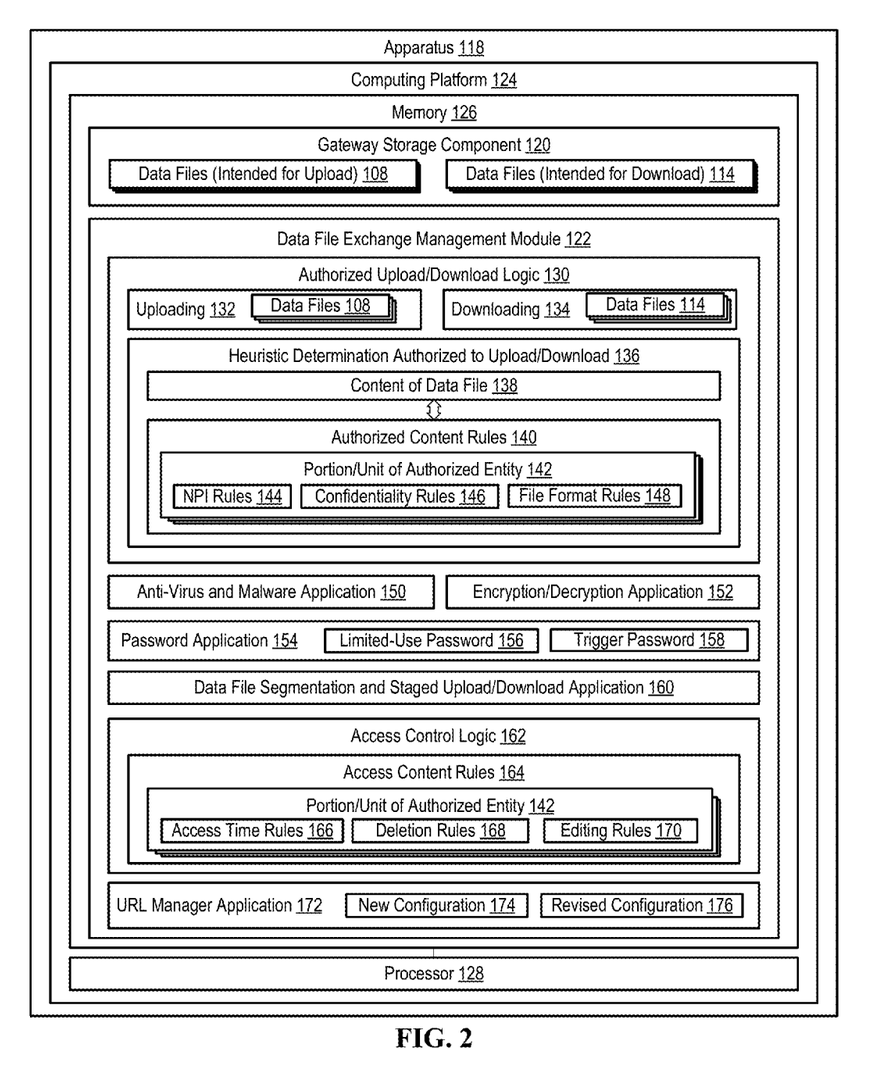
FIG. 2 provides a block diagram of an apparatus for managing and controlling data file exchange amongst an authorized entity and a file hosting service, in accordance with embodiments of the present invention.

Referring to FIG. 2 a block diagram is shown of an apparatus 118 configured for controlling and managing data file exchanges in a file hosting service environment, according to embodiments of the present invention. Apparatus 118, which may comprise multiple computing devices, includes a computing platform 124 having a memory 126 and at least one processor 128 in communication with the memory 126. Memory 126 may comprise volatile and non-volatile memory, such as read-only and/or random-access memory (RAM), read-only memory ROM, EPROM, EEPROM, flash cards, or any memory common to computer platforms. Further, memory 126 may include one or more flash memory cells, or may be any secondary or tertiary storage device, such as magnetic media, optical media, tape, or soft or hard disk. Moreover, memory 126 may comprise cloud storage, such as provided by a file hosting service and/or a cloud connection service.

Further, processor 128 may be an application-specific integrated circuit ("ASIC"), or other chipset, processor, logic circuit, or other data processing device. Processor 128 or other processor such as ASIC may execute an application programming interface ("API") (not shown in FIG. 2) that interfaces with any resident programs or modules, such as data file exchange management module 122 and routines, sub-modules associated therewith or the like stored in memory 126 of apparatus 118. Processor 128 includes various processing subsystems (not shown in FIG. 2) embodied in hardware, firmware, software, and combinations thereof, that enable the functionality of apparatus 118 and the operability of the apparatus 118 on a computing network. For example, processing subsystems allow for initiating and maintaining communications and exchanging data with other networked computing platforms. For the disclosed aspects, processing subsystems of processor 128 may include any subsystem used in conjunction with data file exchange management module 122 and related algorithms, sub-algorithms, modules, sub-modules thereof.

Computer platform 124 may additionally include a communications module (not shown in FIG. 2) embodied in hardware, firmware, software, and combinations thereof, that enables communications among the various components of the computing platform 124, as well as between the other networked devices. Thus, communication analysis module may include the requisite hardware, firmware, software and/or combinations thereof for establishing and maintaining a network communication connection.

Memory 126 includes gateway storage component 120 that is configured to store, at least temporarily, data files 108 received from the authorized entity and intended for uploaded to the file hosting service and data files 114 received from file hosting service(s) and intended for download to the authorized entity/trusted zone. Storing the files in the gateway storage component 120 prior to uploading and downloading the data files 108 and 114 allows for the data files to be analyzed to determine if uploading and/or downloading of the data file is authorized and to apply any applicable access control to the uploaded or downloaded data file 108 and 114.

Additionally, memory 126 stores data file exchange management module 122 that is configured to manage the upload and download of the data files 108 and 114 between the authorized entity and the file hosting service. Specifically module 122 includes authorized upload/download logic 130 that is configured to determine uploading 132 authorization for data files 108 and downloading 134 for data files 114. In specific embodiments of the invention, the module 122 is configured to make a heuristic determination 136 of whether a data file 108 and/or 114 is authorized for upload and/or download. In such embodiments of the invention, the heuristic determination 136 may include comparing the data file contents 138 to one or more authorized content rules 140. The authorized content rules may, in some embodiments of the invention, be specific to a portion/unit 142 of the authorized entity, such as a business unit, division, line-of-business or the like. In specific embodiments of the invention, the authorized content rules 140 may include non-public information (NPI) rules 144, which define rules that exclude NPI information from being disseminated to external entities, such as file hosting services. NPI may include, but is not limited to, information deemed by the authorizing entity to be of a private nature. Additionally, authorized content rules may include confidentiality rules 146, which define rules that exclude confidential information from being disseminated to external entities, such as file hosting services. Confidential information may include, but is not limited to, information associated with an employee, customer or the like, such as name, address, account numbers, identification numbers, contact information and the like. In the event that NPI or confidential information is determined to be included in a data file, the module 122 may be configured to dent the data file 108 or 144 from being uploaded and/or downloaded, or may, in certain embodiments, be configured to remove/scrub the data file to remove the NPI or confidential information prior to uploading or downloading the data file 108 and 114.

Additionally, the authorized content rules 140 may include file format rules 148 that specify authorized file formats for uploading or downloading to or from the file hosting service. For example, in specified embodiments, the authorizing entity, or a portion/unit 142 of the authorizing entity may authorize zip files or spreadsheet files, while files of other types may be denied uploading or downloading. In addition, the authorized content rules 140 may include other rules, such as data element rules that specify parameters for data elements/line items in data files. Such as rules that set predetermined limits on data elements, such as specific allowable number of data items and/or allowable data items/line items amounts. In the event that the module 122 finds one or more unauthorized/unacceptable data items, the module may be configured to deny the data file from being uploaded or downloaded, or, in other embodiments, the module 122 may be configured to remove the data element from the data file 108 or 114 prior to uploading or downloading the data file 108 or 114.

Data file exchange management module 122 may further include various security features for managing the exchange of data files between the authorized entity and the file sharing service. Such security features include anti-virus and/or malware application 150 that is configured to scan the data files for viruses and/or malware prior to uploading the data files 108 to the file hosting service and downloading the files 114 from the file hosting service. Additionally, encryption/decryption application 152 may be implemented to encrypt and/or decrypt data files 108 being uploaded to the file hosting service and, in some embodiments, encrypt and/or decrypt data files being downloaded from the file hosting service. The encryption application 152 may provide for one or more encryption algorithms, such as double encryption, split key encryption or the like.

In addition, data file exchange management module 122 may include password application 154 that is configured to assign a password to the data file(s) that allows for a subsequent user (i.e., the user/subscriber of the file hosting service or someone within the authorizing entity) to access the data file 108 or 114, once the data file 108 or 114 has been uploaded to the file hosting service or downloaded to the authorized entity/trusted zone. The password may be configured as a limited-use password 156 that allows for a predetermined number of uses (i.e., a predetermined number of accesses to the data file). In specific embodiments the limited-use password may be a single-use password. In other embodiments of the invention, the password may be configured as a trigger password 158 that upon entry of the password not only is accessed to the data file 108 or 114 granted but also triggers an action, such as immediate or after a prescribed time period, deletion or call-back of the data file 108 or 114.

In still further embodiments of the invention, the data file exchange management module 122 may include data file segmentation and staged upload/download application 160 that is configured to segment the data file into two or more portions and to upload or download each segment/portion at prescribed time intervals, such a portion every hour, a portion every day or the like.

Additionally, data file exchange management module 122 includes access control logic 164 that is configured to implement access content rules 164 to manage the access to the data files 108 that are uploaded to the file hosting service and, in some embodiments, the data files 114 downloaded from the file hosting service. The access content rules 164 may be specific to a portion/unit 142 of the authorized entity 142, such as a business unit, division, line-of-business or the like. The access content rules 164 may include access time rules 166 that define the life of the data file 108, e.g., how long the data file 108 will remain in the external storage location of the file hosting service before the data file 108 is automatically removed from the file hosting service (e.g., deleted or called back). The access content rules may include other deletion rules 166 that define other criteria/events that may result in deletion and/or call-back of the data file 108 (e.g., maximum number of accesses prior to deletion call-back, unauthorized attempts to edit or alter the data file and the like). Moreover, access content rules 164 may include editing rules 170 that indicate which entities/individuals are authorized to edit the data file 108 once the data file 108 has been uploaded to the file hosting service, the level or type (addition, deletion, change) of editing authorized (e.g., what data elements/fields are authorized to be edited and the like) and the like.

Moreover, data file exchange management module 122 may include Uniform Resource Locator (URL) manager application 172 that is configured to generate new configurations in response to receiving a new URL and update existing configurations (in response to the user/subscriber stopping sharing of the data file and subsequently restarting sharing of the data file or the like) to receiving an updated/different URL. Publically-accessible file sharing services are typically internet-based services that have storage locations via hypertext transfer protocol secure (HTTPS) or the like. As such URLs are used as pointers to storage locations of data files within a file hosting service. In the event that a new or updated URL is generated, the user/subscriber or file hosting service may send an electronic message/mail to intermediary mail server, such as a controlled data exchange storage location (CDESL) electronic mail address or the like. The application 172 is configured to receive the email and automatically generate a new configuration profile for the data file or update an existing configuration profile for the data file. The configuration profile allows for ongoing scheduled data file transfers to occur using the URL. Moreover, the automated generation and update of configuration profiles is tracked, thus providing an audit trail for when, what and why the configuration profile was generated or changed. In addition, the automated generation and update of configuration profiles provides for storing updated configuration profiles, as well as copies of the data associated with each of the URLs associated with the data file. The stored copies of the data may be instrumental for forensic checks by a governance team associated with the entity or the like Referring to FIG. 3 a flow diagram is presented of a method 200 for management and control of data file exchange in a file hosting service environment, in accordance with specific embodiments of the present invention. Specifically, FIG. 3 highlights a method 200 for managing and controlling the uploading of data files to the file hosting service. At Event 202, one or more data files are received, at a landing zone, from an authorized entity (i.e., an entity, such as an enterprise or the like, that has been granted access to a file hosting service by a user/subscriber) that are intended for upload to a file hosting service, such as a cloud-based storage service or the like. The landing zone is an area in a communication network that is located between the publically-accessible file hosting service (i.e., the Internet) and a trusted zone of the authorized entity. As such, the landing zone acts as a gateway between the file hosting service and the authorized entity. At Event 204, the data file(s) are stored, at least temporarily, in a gateway storage component disposed in the landing zone. The gateway storage component stores the data files, at least, prior to uploading the data file(s) to the file hosting service to allow for the data file(s) to be analyzed to determine (i) if the data file(s) are authorized for uploading and, if so, (ii) any access control and security features that are required to be applied to the uploaded data file(s).

Figure 3:
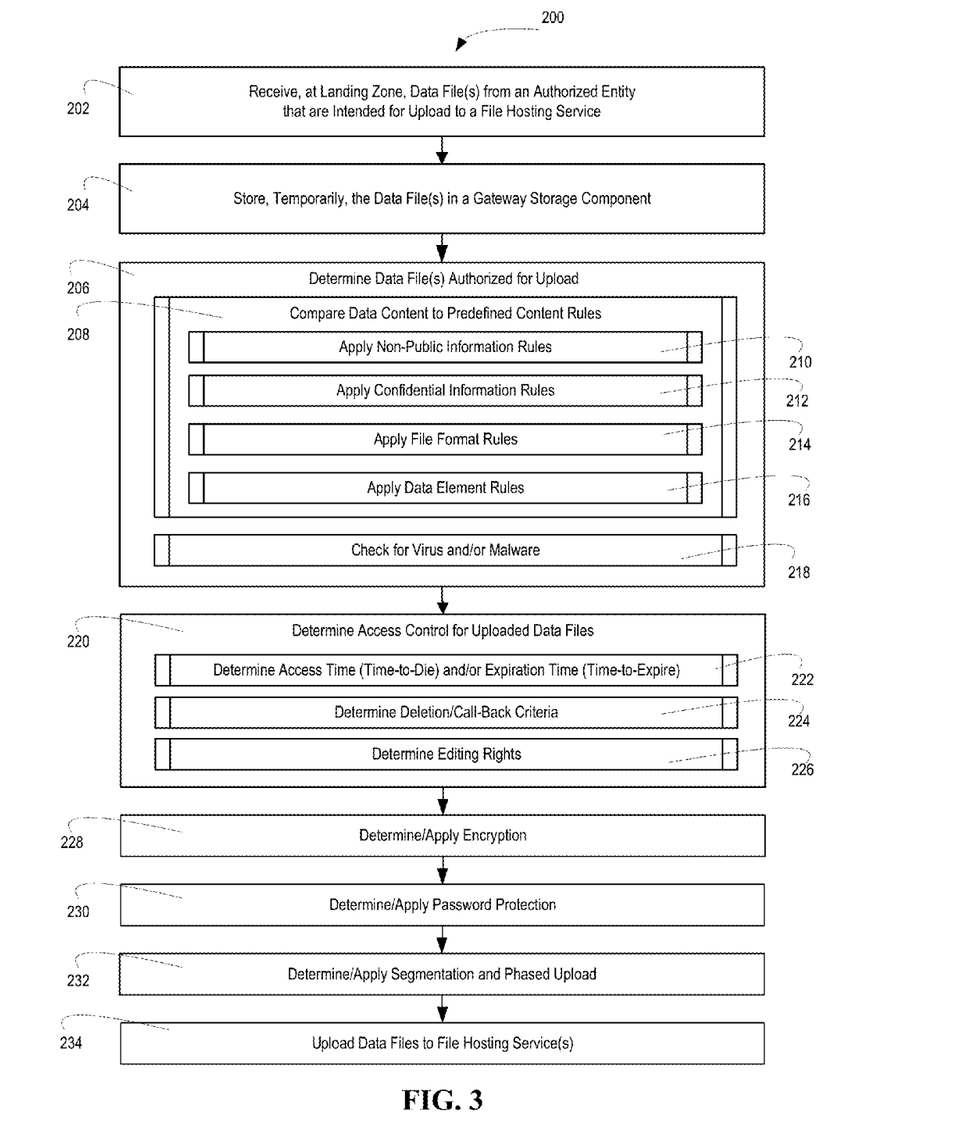
FIG. 3 provides a flow diagram of a method for managing/controlling the uploading of data files from an authorized entity to a file hosting service, in accordance with embodiments of the present invention.

At Event 206, the data file(s) are determined to be authorized for uploading to the file hosting service. In specific embodiments of the method, such a determination is made by implementation of heuristic techniques or the like. In specific embodiments of the method, at Event 208, the determination entails comparison of the content of the data file(s) to predefined content rules. As previously discussed the content rules may be specific to the entire authorized entity or the content rules may be specific to a portion/unit/division of the authorized entity. The comparison of the content of the data file(s) to the predefined content rules may include, at Sub-Event 210, application of Non-Public Information (NPI) rules that define specific information that the authorized entity or a portion/unit/division thereof has defined as private. Further, the comparison of the content of the data file(s) to the predefined content rules may include, at Sub-Event 212, application of confidential information rules that define specific information that is confidential to the authorized entity, employees of the authorized entity or customers/vendors of the authorized entity (e.g., contact information, account numbers, government identification numbers or the like). In the event that application of the NPI rules and/or the confidential information rules results in identification of either NPI or confidential information in a data file, the data file may be denied from being uploaded to the file hosting service or, in some embodiments, the data file may be edited/"scrubbed" to remove the NPI or confidential information from the data file.

Additionally, the comparison of the content of the data file(s) to the predefined content rules may include, at Sub-Event 214, application of file format rules and/or, at Sub-Event 216, data element rules. File format rules may define acceptable file format types, thus, insuring that the data file that is being uploaded to the file hosting service is of an acceptable file format type (e.g., a .zip file, a spreadsheet file or the like). Data element rules define acceptable and/or unacceptable data elements for inclusion in the data files. For example, the data element rules may define a maximum allowable number of data elements/line items for inclusion in a data file, the maximum amount allowable for a single data item, a maximum allowable amount for all of the data items or the like. As previously discussed, the data element rules may be specific to the entire authorized entity or the content rules may be specific to a portion/unit/division of the authorized entity. Moreover, in the event a data element is determined to be unacceptable in accordance with the data element rules, the data file may be denied from being uploaded to the file hosting service or, in some embodiments, the data element may be removed from the data file or edited to comply with the data element rules prior to the data file being uploaded to the file hosting service.

At Event 218, a virus and/or malware check is conducted to insure that the data file(s) being uploaded to the file hosting service do not include any viruses and/or malware. In the event that the check results in identification of a virus or malware, the data file is denied from being uploaded to the file hosting service or, in some embodiments, the virus or malware is removed from the data file prior to uploading the data file.

At Event 220 access control requirements are determined for the data file(s) being uploaded to the file hosting service. As previously discussed, the access control requirements may be specific to the authorizing entity or a portion/unit/division of the authorized entity. Further, the access control requirements are typically specific to the data files being uploaded, such that, certain designated data files will be afforded more access control than other designated data files.

Access control requirements may include, at Sub-Event 222, determining access time and/or expiration time. Access time (otherwise referred to as a "time-to-die", "time-to-die" or "time-to-live") may define the period of time during which the data file may be accessed while in the file hosting service. Once the access time has expired the data file may be configured to be marked for deletion, automatically deleted from the file hosting service and/or called-back to the authorized entity (i.e., communicated back to the authorized entity). Expiration time (otherwise referred to a "time-to-expire) may define the period of time during which the data in the file is verifiable as being valid. Once the expiration time has expired the data in the file is no longer confirmable by the authorized entity as being valid.

Further, access control requirements may include, at Sub-Event 224, determining deletion/call-back criteria. Deletion/call-back criteria may include a specified number of allowable accesses to the data file (e.g., the data file is deleted and/or called-back after 5 accesses), a specified period of time after a first access (e.g., the data file is deleted and/or called-back 30 days after the first access), a specified period of time of no accesses (e.g., the data file is deleted or called-back if the data file is accessed within 5 business days or the like). Moreover, access control requirements may include, at Sub-Event 226, determining editing rights for the uploaded data file. Editing rights may include, but are not limited to, whether the user/subscriber of the file hosting service has rights to edit the data file and, if so, which individuals/entities of the user/subscriber have such rights and which portion of the data file may be edited.

At Events 228, 230, 232, further security measures may be taken that serve to insure that the data file being uploaded is only accessed by authorized individuals or entities of the user/subscriber of the file hosting service. At Event 228, an encryption method may be determined/identified and applied to the data file(s). Any known or future known encryption method may be used including, but not limited to, split key encryption, double encryption and the like. At Event 230, password protection may be determined and applied to the data file(s). Password protection may include a limited-use password that is configured to allow for the password to be used a designated number of times (i.e., the user can only access the data file the designated number of times), such as a single-use password or the like. In other embodiments of the invention, the password may be configured as a trigger password that triggers an event, such as deletion and/or call-back after a predetermined time period or a predetermined number of usages of the password. At Event 232, segmentation and phased uploading may be determined and applied to the data file(s). Segmentation provides for segmenting/portioning a data file into two or more segments/portions and phased uploading provides for uploading each segment at different time period (e.g., one segment/portion each hour, each day or the like).

Once the data file has been authorized for uploading and appropriate access control and security measures have been implemented, at Event 234, the data file(s) is/are uploaded to the file hosting service.

Figure 4:
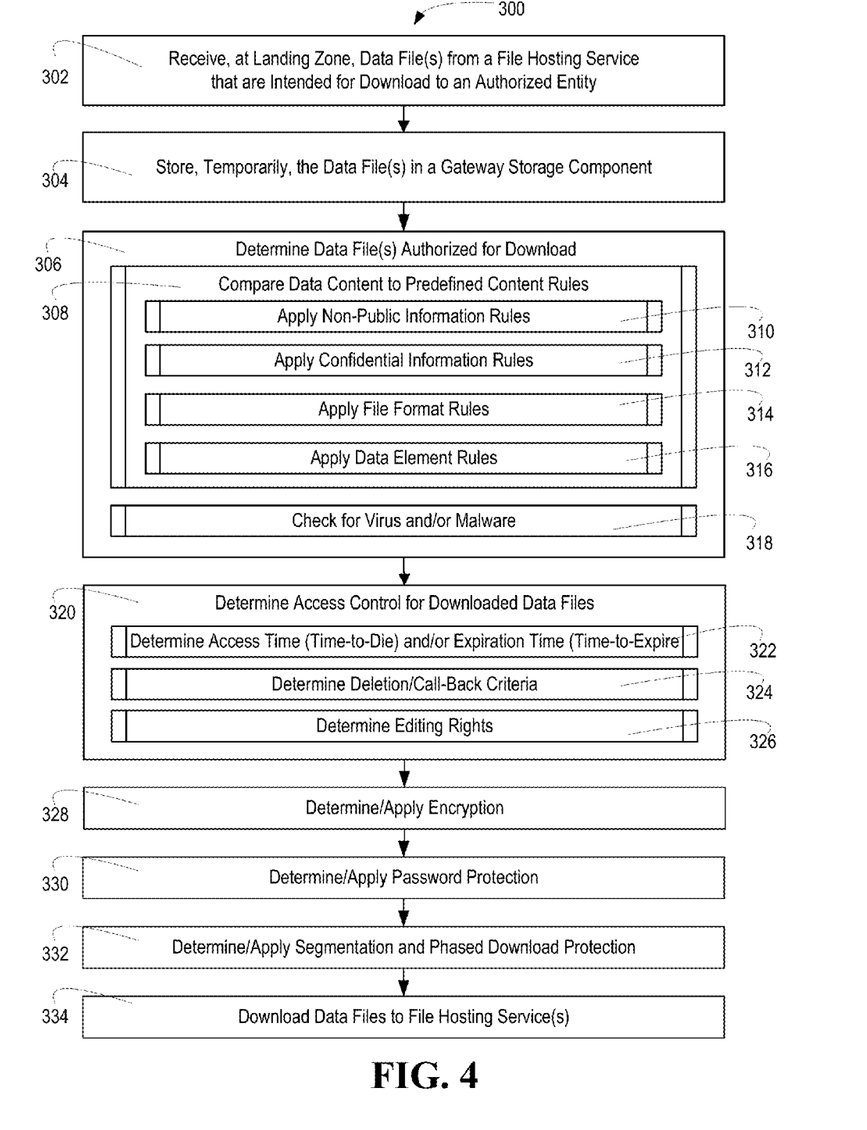
FIG. 4 provides a flow diagram of a method for managing/controlling the downloading of data files from a file hosting service to an authorized entity, in accordance with embodiments of the present invention.

Referring to FIG. 4 a flow diagram is presented of a method 300 for management and control of data file exchange in a file hosting service environment, in accordance with specific embodiments of the present invention. Specifically, FIG. 4 highlights a method 300 for managing and controlling the uploading of data files to the file hosting service. At Event 302, one or more data files are received, at a landing zone, from file hosting service that are intended for downloading to the authorized entity. At Event 304, the data file(s) are stored, at least temporarily, in a gateway storage component disposed in the landing zone. The gateway storage component stores the data files, at least, prior to downloading the data file(s) to the authorized entity to allow for the data file(s) to be analyzed to determine (i) if the data file(s) are authorized for downloading and, if so, (ii) any access control and security features that are required to be applied to the downloaded data file(s).

At Event 306, the data file(s) are determined to be authorized for downloading to the authorized entity. In specific embodiments of the method, such a determination is made by implementation of heuristic techniques or the like. In specific embodiments of the method, at Event 308, the determination entails comparison of the content of the data file(s) to predefined content rules. As previously discussed the content rules may be specific to the entire authorized entity or the content rules may be specific to a portion/unit/division of the authorized entity. The comparison of the content of the data file(s) to the predefined content rules may include, at Sub-Event 310, application of Non-Public Information (NPI) rules that define specific information that the authorized entity or a portion/unit/division thereof has defined as private. Further, the comparison of the content of the data file(s) to the predefined content rules may include, at Sub-Event 312, application of confidential information rules that define specific information that is confidential to the authorized entity and/or user/subscriber of the file hosting service. In the event that application of the NPI rules and/or the confidential information rules results in identification of either NPI or confidential information in a data file, the data file may be denied from being downloaded to the authorized entity or, in some embodiments, the data file may be edited/"scrubbed" to remove the NPI or confidential information from the data file.

Additionally, the comparison of the content of the data file(s) to the predefined content rules may include, at Sub-Event 314, application of file format rules and/or, at Sub-Event 316, data element rules. File format rules may define acceptable file format types, thus, insuring that the data file that is being downloaded to the authorized entity is of an acceptable file format type (e.g., a .zip file, a spreadsheet file or the like). Data element rules define acceptable and/or unacceptable data elements for inclusion in the data files. For example, the data element rules may define a maximum allowable number of data elements/line items for inclusion in a data file, the maximum amount allowable for a single data item, a maximum allowable amount for all of the data items or the like. As previously discussed, the data element rules may be specific to the entire authorized entity or the content rules may be specific to a portion/unit/division of the authorized entity. Moreover, in the event that a data element is determined to be unacceptable in accordance with the data element rules, the data file may be denied from being downloaded to the authorized entity or, in some embodiments, the data element may be removed from the data file or edited to comply with the data element rules prior to the data file being downloaded to the authorized entity.

At Event 318, a virus and/or malware check is conducted to insure that the data file(s) being downloaded to the authorized entity do not include any viruses and/or malware. In the event that the check results in identification of a virus or malware, the data file is denied from being downloaded to the authorized entity or, in some embodiments, the virus or malware is removed from the data file prior to downloading the data file.

At Event 320 access control requirements are determined for the data file(s) being downloaded to the authorized entity. As previously discussed, the access control requirements may be specific to the authorizing entity or a portion/unit/division of the authorized entity. Further, the access control requirements are typically specific to the data files being downloaded, such that, certain designated data files will be afforded more access control than other designated data files. Further, while access control is typically more of a concern to the authorized entity when uploading a data files to the file hosting service, the authorized entity may desire, in certain embodiments of the invention, to impose access controls on data files being downloaded from the file hosting service.

Access control requirements may include, at Sub-Event 322, determining access time or expiration time. Access time (otherwise referred to as a "time-to-die", "time-to-die" or "time-to-live") may define the period of time during which the data file may be accessed while at the authorized entity. Once the access time has expired the data file may be configured to be automatically deleted from the authorized entity and/or called-back to the file hosting service (i.e., communicated back to the file hosting service). Expiration time (otherwise referred to a "time-to-expire) may define the period of time during which the data in the file is verifiable as being valid. Once the expiration time has expired the data in the file is no longer confirmable by the authorized entity as being valid.

Further, access control requirements may include, at Sub-Event 324, determining deletion/call-back criteria. Deletion/call-back criteria may include a specified number of allowable accesses to the data file (e.g., the data file is deleted and/or called-back after 5 accesses), a specified period of time after a first access (e.g., the data file is deleted and/or called-back 30 days after the first access), a specified period of time of no accesses (e.g., the data file is deleted or called-back if the data file is accessed within 5 business days or the like). Moreover, access control requirements may include, at Sub-Event 326, determining editing rights for the downloaded data file. Editing rights may include, but are not limited to, whether the authorized entity has rights to edit the data file and, if so, which individuals/entities within the authorized entity have such rights and which portion of the data file may be edited.

At Events 328, 330, 332, further security measures may be taken that serve to insure that the data file being downloaded is only accessed by authorized individuals or entities of the authorized entity. Further, while security measures are typically more of a concern to the authorized entity when uploading a data files to the file hosting service, the authorized entity may desire, in certain embodiments of the invention, to impose security features on data files being downloaded from the file hosting service. At Event 328, an encryption method may be determined/identified and applied to the data file(s). Any known or future known encryption method may be used including, but not limited to, split key encryption, double encryption and the like. At Event 330, password protection may be determined and applied to the data file(s). Password protection may include a limited-use password that is configured to allow for the password to be used a designated number of times (i.e., the user can only access the data file the designated number of times), such as a single-use password or the like. In other embodiments of the invention, the password may be configured as a trigger password that triggers an event, such as deletion and/or call-back after a predetermined time period or a predetermined number of usages of the password. At Event 332, segmentation and phased downloading may be determined and applied to the data file(s). Segmentation provides for segmenting/portioning a data file into two or more segments/portions and phased uploading provides for uploading each segment at different time period (e.g., one segment/portion each hour, each day or the like).

Once the data file has been authorized for downloading and appropriate access control and security measures have been implemented, at Event 334, the data file(s) is/are downloaded to the file hosting service.

Thus, systems, apparatus, methods, and computer program products described above provide for controlling data file transfer exchange to and from file hosting services, such as cloud-based file hosting services. In this regard the present invention proves for an "outside in" approach to controlling data file exchanges between a file hosting service and an authorized entity (i.e., an entity that has been granted access by a user/subscriber to a publically-accessible file hosting service.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for controlled data file exchange to and from a file hosting service, the system comprising:
   a publically-accessible file hosting service configured to store data files; and
   a data file landing zone in computing network communication with the file hosting service and configured to logically manage access by an authorized entity to the file hosting service by controlling (1) uploading of data files to the file hosting service, and (2) downloading of data files from the file hosting service, wherein the authorized entity is granted access to the file hosting service by a user of the file hosting service, wherein the data file landing zone includes:
      a Uniform Resource Locator (URL) manager application configured to generate and store in memory a new configuration profile in response to receiving a new URL from the file hosting service and update an existing configuration profile stored in memory in response to receiving a revised URL from the file hosting service, wherein each URL is associated with a storage location of a data file within the file hosting service and wherein the configuration profiles are accessible to allow for scheduled data file uploads to occur using the URL included within an associated configuration profile.

2. The system of claim 1, wherein the data file landing zone is further configured to control uploading of data files to the file hosting service and downloading of data files from the file hosting service by heuristically determining that a data file is authorized for uploading to the file hosting service or authorized for downloading from the file hosting service.

3. The system of claim 2, wherein the data file landing zone is further configured to heuristically determine that a data file is authorized for uploading to the file hosting service and downloading from the file hosting service based on determining content of the data file and comparing the content of the data file to predetermined authorized content rules.

4. The system of claim 1, wherein the data file landing zone is further configured to control uploading and downloading of data files to the file hosting service by denying data files found to include a virus or malware from being uploaded to the file hosting service or downloaded from the file hosting service.

5. The system of claim 1, wherein the data file landing zone is further configured to control uploading of data files to the file hosting service by denying data files found to include confidential or non-public information from being uploaded to the file hosting service.

6. The system of claim 1, wherein the data file landing zone is further configured to control uploading of data files to the file hosting service by encrypting data files being uploaded to the file hosting service.

7. The system of claim 1, wherein the data file landing zone is further configured to control uploading of data files to the file hosting service by assigning a password to data files being uploaded to the file hosting service, wherein the password is required to be presented to access an associated data file.

8. The system of claim 7, wherein the data file landing zone is further configured to assign a use-limiting password to a data file being uploaded to the file hosting service, wherein the use-limiting password is configured to allow for a predetermined number of accesses to the data file once it is uploaded to the file hosting service.

9. The system of claim 7, wherein the data file landing zone is further configured to assign the password that is configured to trigger deletion or call-back of the data file upon presenting the password for access to the data file.

10. The system of claim 1, wherein the data file landing zone is further configured to control uploading of data files to the file hosting service by uploading or downloading the data files in two or more portions, wherein each portion is uploaded or downloaded at a predetermined time interval.

11. The system of claim 1, wherein the data file landing zone is further configured to control uploading and downloading of data files to the file hosting service by determining a file format of the data and comparing the file format to file formats authorized for uploading or downloading.

12. The system of claim 1, wherein the data file landing zone is further configured to control uploading and downloading of data files to the file hosting service by implementing rules configurable by the authorized entity.

13. The system of claim 12, wherein the rules configurable by the authorized entity include a rule that defines an allowable time period for accessing a data file stored within the file hosting service.

14. The system of claim 12, wherein the rules configurable by the authorized entity includes a rule that defines criteria for removing a data file from the file hosting service.

15. The system of claim 12, wherein the rules configurable by the authorized entity includes a rule for allowing the authorizing entity to edit a data file that is stored within the file hosting service.

16. An apparatus for controlled data file exchange to and from a file hosting service, the system comprising:
a computing platform including a memory and at least one processor in communication with the memory;
a gateway storage component included in the memory and configured to receive and temporarily store (2) first data files from an authorized entity that are intended to be uploaded to a publically-accessible file hosting service, and (2) second data filed from the file hosting service that are intended to be downloaded to the authorized entity;
a data file exchange management module stored in the memory, executable by the processor and configured to logically manage access by the authorized entity to the file hosting service by controlling (1) uploading of the first data files from the data storage unit to the file hosting service, and (2) downloading of second data files from the gateway storage component to the authorized entity,
wherein the authorized entity is granted access to the file hosting service by a user of the file hosting service; and
a Uniform Resource Locator (URL) manager application stored in the memory, executable by the processor and configured to generate and store in memory a new configuration profile in response to receiving a new URL from the file hosting service and update an existing configuration profile stored in memory in response to receiving a revised URL from the file hosting service, wherein each URL is associated with a storage location of a data file within the file hosting service and wherein the configuration profiles are accessible to allow for scheduled data file uploads to occur using the URL included within an associated configuration profile.

17. The apparatus of claim 16, wherein the data file exchange management module is further configured to control uploading of the first data files to the file hosting service and downloading of the second data files by heuristically determining that the first data files are authorized for uploading to the file hosting service and that the second data files are authorized for downloading from the gateway storage component.

18. The apparatus of claim 17, wherein the data file exchange management module is further configured to heuristically determine that a first data file is authorized for uploading to the file hosting service and that second data file is authorized for downloading from the gateway storage component based on determining content of a data file and comparing the content of the data file to predetermined authorized content rules.

19. A computer program product including a non-transitory computer-readable medium, the computer-readable medium comprising:
a first set of codes for causing a computer to receive and temporarily store, at a gateway storage component, first data files communicated from a file hosting service and intended for downloading by an authorized entity;
a second set of codes for causing a computer to receive and temporarily store, at the gateway storage component, second data files communicated from the authorized entity and intended for uploading to the file hosting service;
a third set of codes for causing a computer to logically manage access by the authorized entity to the file hosting service by controlling (1) uploading of the first data files from the data storage unit to the file hosting service, and (2) downloading of second data files from the gateway storage component to the authorized entity,
wherein the authorized entity is granted access to the file hosting service by a user of the file hosting service; and
a fourth set of codes for causing a computer to generate and store in memory a new configuration profile in response to receiving a new URL from the file hosting service and update an existing configuration profile stored in memory in response to receiving a revised URL from the file hosting service, wherein each URL is associated with a storage location of a data file within the file hosting service and wherein the configuration profiles are accessible to allow for scheduled data file uploads to occur using the URL included within an associated configuration profile.

* * * * *